(12) United States Patent
Tuers et al.

(10) Patent No.: US 9,904,472 B2
(45) Date of Patent: Feb. 27, 2018

(54) MEMORY SYSTEM AND METHOD FOR DELTA WRITES

(71) Applicant: SanDisk Technologies Inc., Plano, TX (US)

(72) Inventors: Daniel E. Tuers, Kapaa, HI (US); Abhijeet Manohar, Bangalore (IN); Judah Gamliel Hahn, Ofra (IL)

(73) Assignee: SanDisk Technologies LLC, Plano, TX (US)

( * ) Notice: Subject to any disclaimer, the term of this patent is extended or adjusted under 35 U.S.C. 154(b) by 78 days.

(21) Appl. No.: 14/664,127

(22) Filed: Mar. 20, 2015

(65) Prior Publication Data

US 2016/0224253 A1 Aug. 4, 2016

(30) Foreign Application Priority Data

Jan. 30, 2015 (IN) .......................... 313/MUM/2015

(51) Int. Cl.
*G06F 3/06* (2006.01)
(52) U.S. Cl.
CPC .......... *G06F 3/0608* (2013.01); *G06F 3/0641* (2013.01); *G06F 3/0643* (2013.01); *G06F 3/0679* (2013.01); *G06F 3/0688* (2013.01)
(58) Field of Classification Search
CPC .... G06F 3/0608; G06F 3/0643; G06F 3/0679; G06F 3/0688
USPC .................................................. 711/158, 159
See application file for complete search history.

(56) References Cited

U.S. PATENT DOCUMENTS

| | | | |
|---|---|---|---|
| 8,001,215 B2* | 8/2011 | Dominowska .... | G06F 17/30867 709/218 |
| 2007/0130232 A1* | 6/2007 | Therrien .................... | G06F 8/71 |
| 2008/0010378 A1* | 1/2008 | Parker .................... | G06Q 10/10 709/226 |
| 2011/0246869 A1* | 10/2011 | Vion-Dury .......... | G06F 17/2211 715/229 |
| 2013/0013557 A1* | 1/2013 | Kunath .................. | G01C 21/32 707/609 |
| 2013/0055231 A1* | 2/2013 | Hyndman ................. | G06F 8/68 717/169 |
| 2013/0191342 A1* | 7/2013 | Sreedharan .......... | G06F 11/1446 707/644 |
| 2015/0154234 A1* | 6/2015 | Sreedharan .......... | G06F 11/1446 707/638 |

* cited by examiner

*Primary Examiner* — Pierre-Michel Bataille
(74) *Attorney, Agent, or Firm* — Brinks Gilson & Lione (57) ABSTRACT

A memory system and method for delta writes are provided. In one embodiment, a memory system receives a request to store data in the memory and determines whether the data requested to be stored in the memory is a modified version of data already stored in the memory. If it is, the memory system compares the data requested to be stored in the memory with the data already stored in the memory to identify differences between the data to be stored and the data already stored. The memory system then stores the identified differences in the memory, along with a table that maps the stored identified differences to corresponding locations in the data already stored in the memory. Other embodiments are provided.

37 Claims, 11 Drawing Sheets

MEMORY SYSTEM AND METHOD FOR DELTA WRITES

PRIORITY

This application claims priority to India Patent Application No. 313/MUM/2015, filed on Jan. 30, 2015, entitled "Memory System and Method for Delta Writes," the entire disclosure of which is hereby incorporated by reference.

BACKGROUND

Many memory systems treat a host request to write a file as a new write, meaning that the entire file is written in memory even if the file is a modified version of an already-stored file. Accordingly, the memory may contain multiple copies of the same file, each with slight modifications, which is a sub-optimal use of the memory. One way to address this issue is by using a technique known as "deduplication." "Deduplication" refers to the process of identifying N duplicate copies of data in memory, physically storing only one copy of the data, and using a table to map the N logical block addresses for the data to the one physical address that actually stores the data. However, deduplication algorithms can be very complex and require a large amount of firmware and hardware overhead.

OVERVIEW

Embodiments of the present invention are defined by the claims, and nothing in this section should be taken as a limitation on those claims.

By way of introduction, the below embodiments relate to a memory system and method for delta writes. In one embodiment, a memory system receives a request to store data in the memory and determines whether the data requested to be stored in the memory is a modified version of data already stored in the memory. If it is, the memory system compares the data requested to be stored in the memory with the data already stored in the memory to identify differences between the data to be stored and the data already stored. The memory system then stores the identified differences in the memory, along with a table that maps the stored identified differences to corresponding locations in the data already stored in the memory.

In another embodiment, a memory system is provided that detects a delta write triggering event, identifies delta data between data requested to be stored in the memory and previously-stored data, stores the delta data in the memory, and stores an entry in a delta table in the memory that integrates the delta data with the previously-stored data.

In yet another embodiment, a memory system is provided with a memory, a modification detection module configured to determine whether data to be stored in the memory is a modified version of data already stored in the memory, a differencing engine configured to compare the data to be stored in the memory with the data already stored in the memory to identify differences between the data to be stored and the data already stored, and a modification storing module configured to store the differences in the memory and to store a table in the memory that maps the differences to the data already stored in the memory.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

As mentioned in the background section above, many memory systems treat a host request to write a file as a new write, meaning that the entire file is written in memory even if the file is a modified version of an already-stored file. To avoid wasting memory space with duplicate copies of the same data, a deduplication process can be used to identify N duplicate copies of data in memory and physically store only one copy of the data. However, deduplication algorithms can be very complex and require a large amount of firmware and hardware overhead. Further, even when duplicate data is identified, writes to the memory are still required, as the mapping table needs to be updated to show that the N logical block addresses for the data map to the one physical address that actually stores the data.

The following embodiments provide more efficient ways of storing a modified version of data already stored in memory. Before turning to these and other embodiments, the following paragraphs provide a discussion of exemplary memory systems that can be used with these embodiments. Of course, these are just examples, and other suitable types of storage modules can be used.

Figures 1A, 1B:
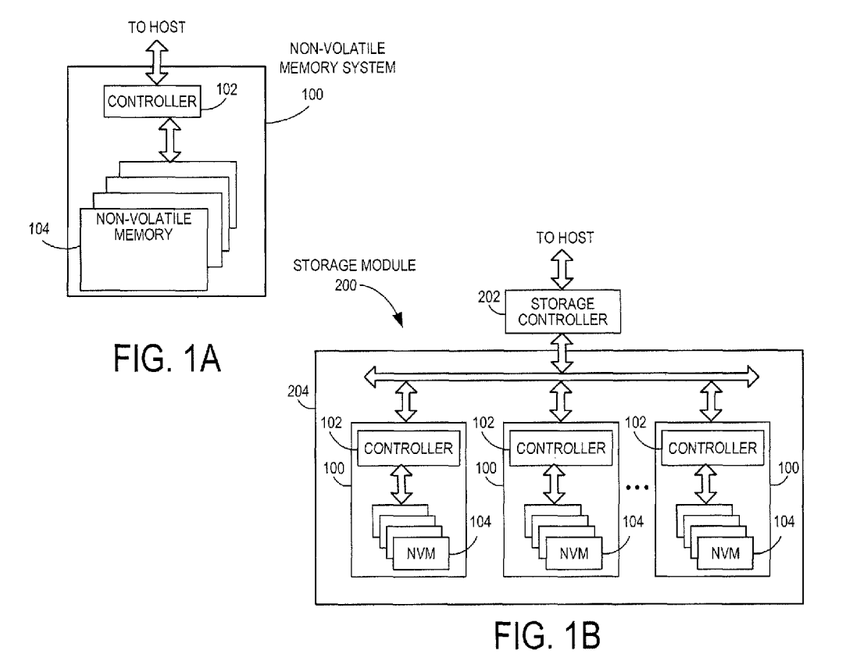
FIG. 1A is a block diagram of a non-volatile memory system of an embodiment.
FIG. 1B is a block diagram illustrating an exemplary storage module of an embodiment.
Figure 1C:
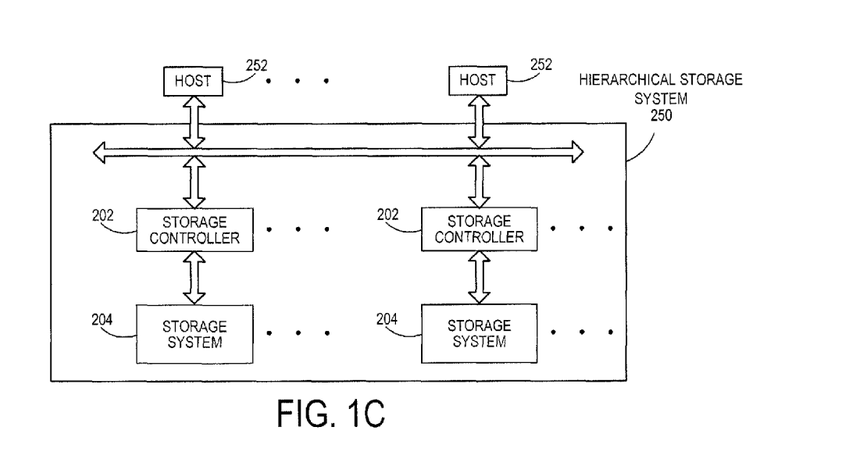
FIG. 1C is a block diagram illustrating a hierarchical storage system of an embodiment.

Memory systems suitable for use in implementing aspects of these embodiments are shown in FIGS. 1A-1C. FIG. 1A is a block diagram illustrating a non-volatile memory system according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
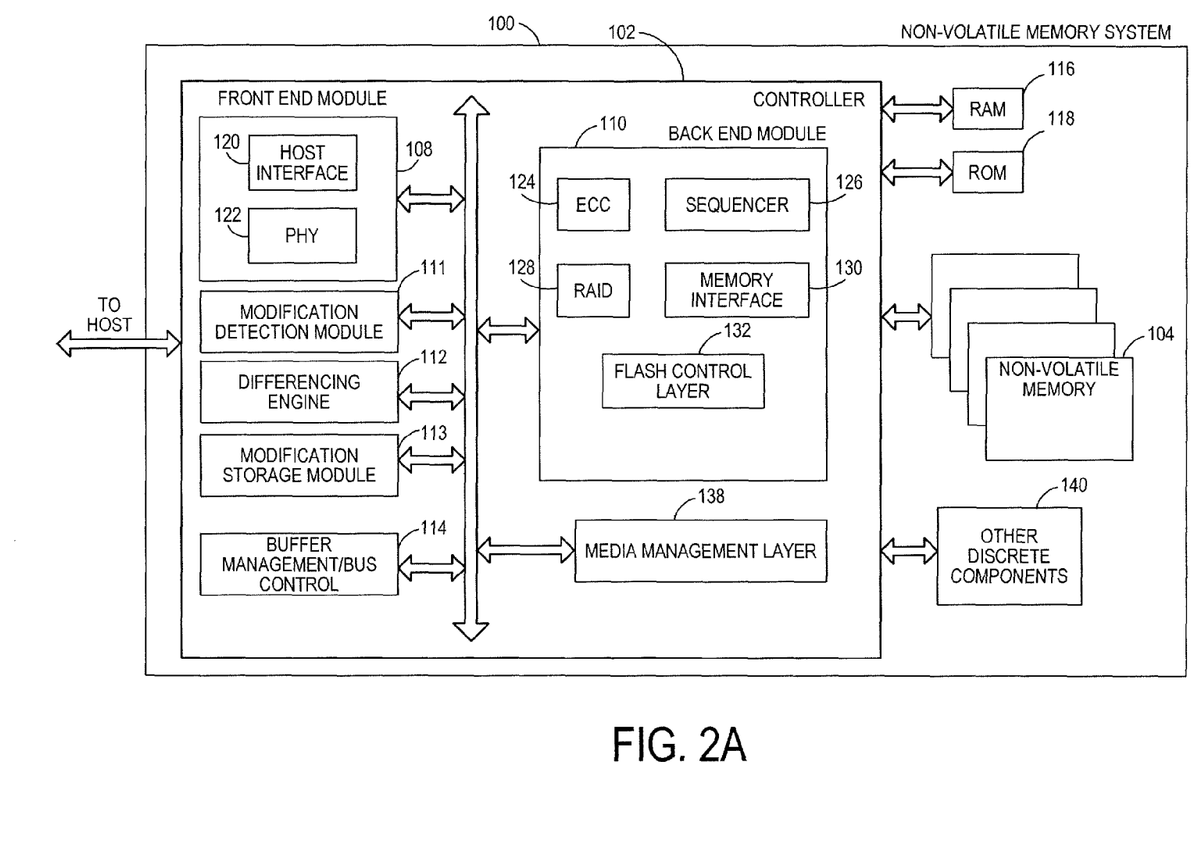
FIG. 2A is a block diagram illustrating exemplary components of the controller of the non-volatile memory system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a modification detection module 111 configured to determine whether data to be stored in the memory 104 is a modified version of data already stored in the memory 104, a differencing engine 112 configured to compare the data to be stored in the memory 104 with the data already stored in the memory 104 to identify differences between the data to be stored and the data already stored, and a modification storing module 113 configured to store the differences in the memory 104 and to store a table in the memory 104 that maps the differences to the data already stored in the memory 104. These modules will be discussed in more detail below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PITY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
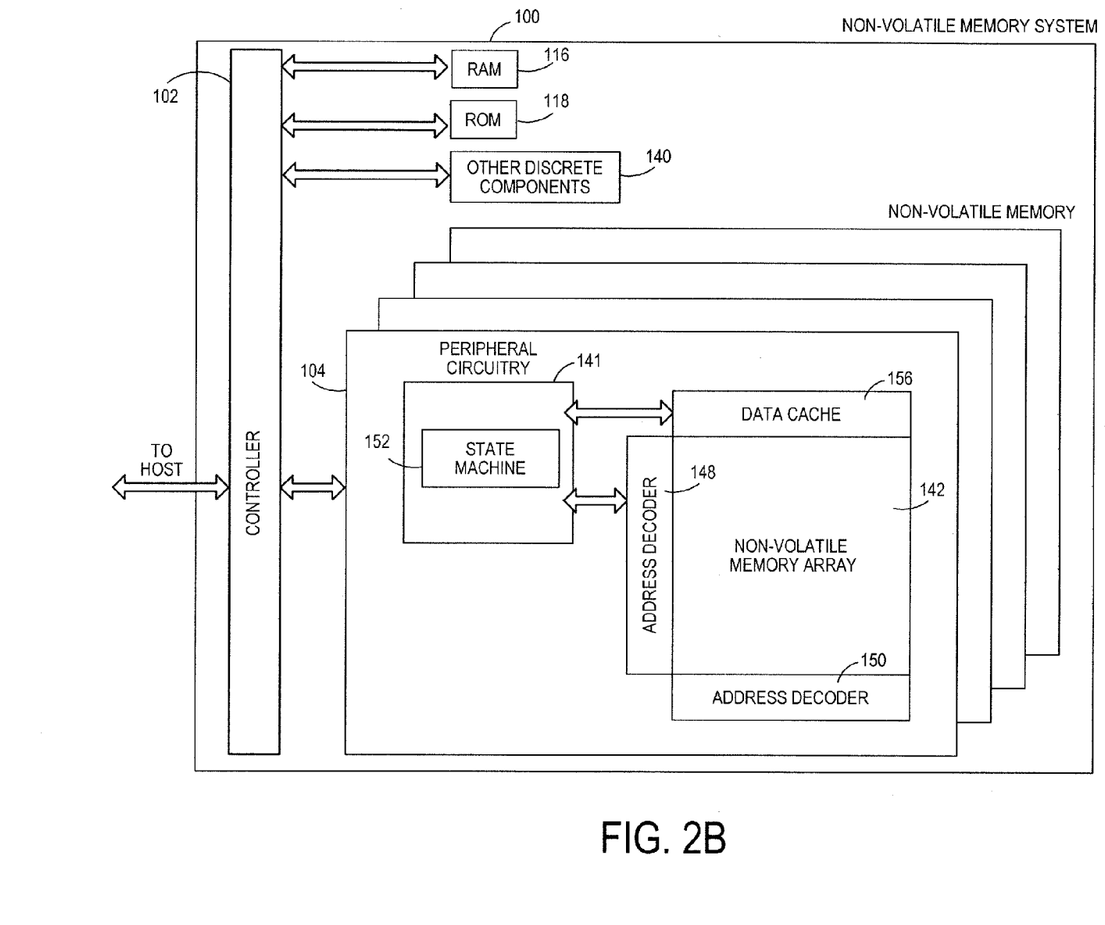
FIG. 2B is a block diagram illustrating exemplary components of the non-volatile memory of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

As mentioned above, many memory systems treat a host request to write a file as a new write, meaning that the entire file is written in memory even if the file is a modified version of an already-stored file. However, most of the disk space except for temporary space is fairly static. Small updates to existing non-compressed files are perceived by the host as new updates, and the host will normally write the entire file again. Complex deduplication algorithms can be used to identify N duplicate copies of data in memory and physically store only one copy of the data but writes to the memory are still required for the duplicate copies, as a mapping table needs to be updated to show that the N logical block addresses for the data map to the one physical address that actually stores the data.

The following embodiments provide more efficient ways of storing a modified version of data already stored in memory, which will be referred to herein as "delta writes." With a delta write, instead of writing the entire file again, the memory system 100 can use external or internal hints to derive that the operation is a modification and then determine the extent of the modification and whether to apply the write as a new write or as a delta write. More specifically, when the memory system 100 receives a request to store data in the memory 104, the memory system 100 (e.g., the controller 102 or another component in the memory system 100) determines whether the data requested to be stored in the memory 104 is a modified version of data already stored in the memory 104. If it is, the memory system 100 compares the data requested to be stored in the memory 104 with the data already stored in the memory 104 to identify differences between the data to be stored and the data already stored. The memory system 100 then stores the identified differences in the memory 104, along with a table that maps the stored identified differences to corresponding locations in the data already stored in the memory 104. Before turning to a detailed example of this embodiment, the following paragraphs will set forth various terms that will be used in the example.

First, any suitable granularity of "data" can be used. For example, the "data requested to be stored" and the "data to be stored" can be an entire file, an "extent" (a sequential run of logical space), a string, or one or more minimum read/write units (e.g., a "codeword" with data and ECC bits). Of course, these are merely examples, and other forms of data can be used.

Figure 3A:
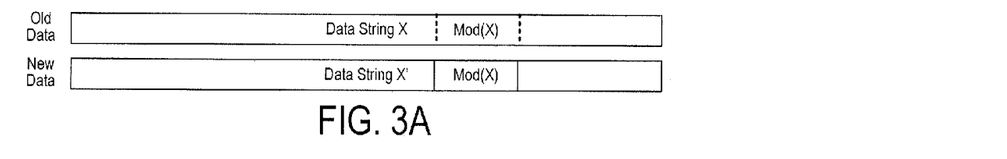
FIGS. 3A-3E are illustrations of data modifications of an embodiment.
Figure 3B:
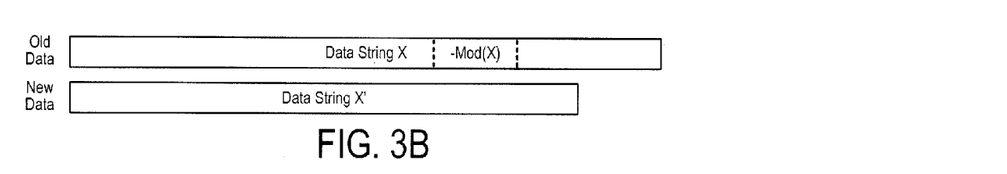
Figure 3C:
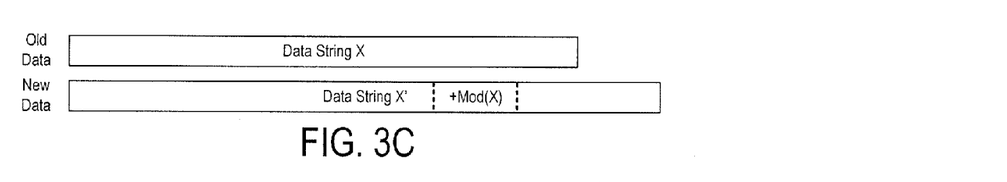
Figure 3D:
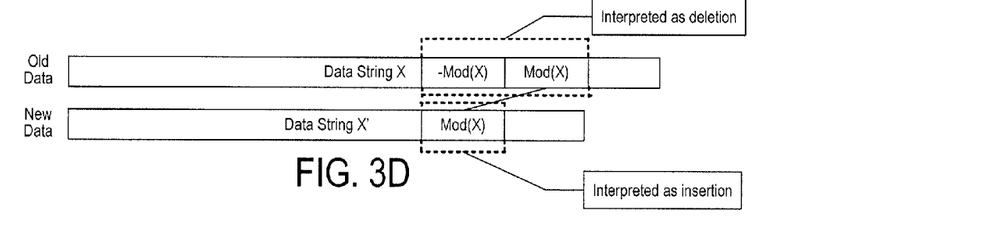
Figure 3E:
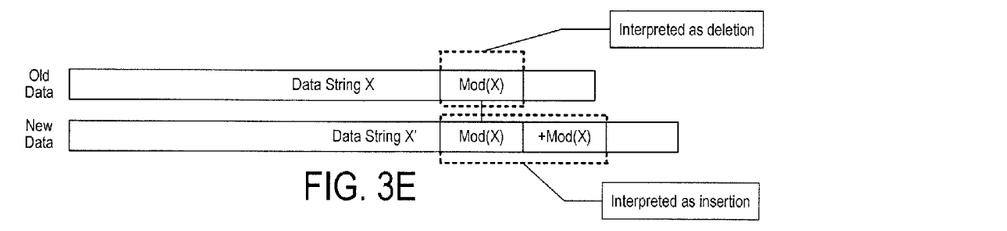

Further, a "modified" version of data already stored in the memory can refer to any type of modification, including, but not limited to, a change, an addition, and/or a deletion. A modification may or may not change the overall length of the originally-stored data. FIGS. 3A-3E provide illustrations of various examples of modifications. In FIG. 3A, the previously-stored data in the memory 104 ("old data") is a data string, and the data to be stored in the memory 104 ("new data") is a changed version of the data string. Specifically, a section (Mod(X)) in the data string is being replaced with a section of the same size. Accordingly, the data to be stored in the memory 104 is of the same size as the previously-stored data, so the modification does not change the length of the data string. In FIG. 3B, the modification is a deletion of the section. So, here, the modification results in a removal of bytes, reducing the overall length of the data string. In FIG. 3C, the modification is an addition of a data. So, here, the modification results in the insertion of bytes, increasing the overall length of the data string. FIG. 3D shows a modification that is a combination of insertion and deletion. First, a section of data is being deleted, then another section of data is being changed. In this particular example, the modification is interpreted as a "deletion+insertion" instead of a "deletion+change," with the deletion size being −Mod(X)+Mod(X), and the insertion size being Mod(X). Here, the overall length of the data string is reduced. In FIG. 3E, there is a change to previously-stored data and an addition of data. In this particular example, the modification is interpreted as a "deletion+insertion" instead of a "deletion+change," with the deletion size being Mod(X), and the insertion size being Mod(X)+Mod(X). Here, the overall length of the data string is increased.

The request to store a modified version of previously-stored data can come from a module internal to the storage system 100 or from a component external to the storage system 100, such as a host. Examples of hosts include, but are not limited to, a mobile phone, a tablet computer, a digital media player, a game device, a personal digital assistant (PDA), a mobile (e.g., notebook, laptop) personal computer (PC), or a book reader.

Figure 4:
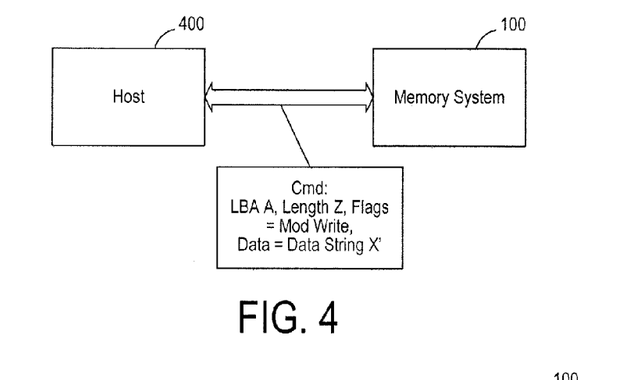
FIG. 4 is a diagram of an embodiment for using a hint from a host to determine whether data is a modified version of already-stored data.

With examples of "data" and "modification" having been discussed, the following paragraphs provide an exemplary implementation of a delta write technique of an embodiment. As explained above, the first step is to determine if the delta write technique should even be applied at all (i.e., whether a delta write triggering event has occurred). To do this, the memory system 100 (e.g., using the controller 102, the modification detection module 111, or another component in the memory system 100) determines whether data requested to be stored in the memory 104 is a modified version of data already stored in the memory 104. This determination can be performed in any suitable manner. For example, the memory system 100 can determine that data requested to be stored in the memory 104 is a modified version of data already stored in the memory 104 via an indication (or "hint") received from the host sending the request to store the data. This is shown in FIG. 4, where the host 400 includes a "mod write" flag in a command it sends to the memory system 100 to write data. (In the NVMe protocol, this flag can be an indication that the write operation is a modification of an existing extent.) Here, the host 400 indicates via a hint through its operating system and input-output stack that this is a modification operation. (The use of hints reduces the overhead needed in the memory system 100 for the delta write operation.) The memory system 100 can then compare and derive the difference and, as discussed below, can figure out how best to store the data (e.g., either by storing the entire data as a complete set or as a modification).

As another example, instead of or in addition to using an indication from the host 400, the memory system 100 can use the data stored in the memory 104 as an internal hint to derive whether or not the data requested to be stored in the memory 104 is a modified version of data already stored in the memory 104. For example, the memory system 100 can compare (e.g., using the differencing engine 112) part of the data to be stored (e.g., the first 4 KB (or other amount)) with corresponding parts of data already stored in the memory 104 (e.g., the first 4 KB of every stored file (or extent)) to see if there is a match. Looking at only part of the data avoids reading the entire data string from the memory 104 unless there is a match. The corresponding parts ("fingerprints") of the stored data can be read from the memory 104 on-the-fly when the write request is received or can be read and pre-stored (e.g., in a hash table cached in RAM 116 or in the memory 104) before the request is received. If there is a match, it is likely that the data requested to be stored is a modified version of the matched stored data, and the delta write process can be performed. Otherwise, the data requested to be stored can be considered new data, and the delta write process does not need to be performed.

Assuming the delta write process is to be performed, the memory system 100 then compares (e.g., using the controller 102, the differencing engine 112, or another component in the memory system 100) the data requested to be stored in the memory 104 with the data already stored in the memory 104 to identify differences between the data to be stored and the data already stored. This is shown generally in the block diagram of FIG. 5.

Figure 5:
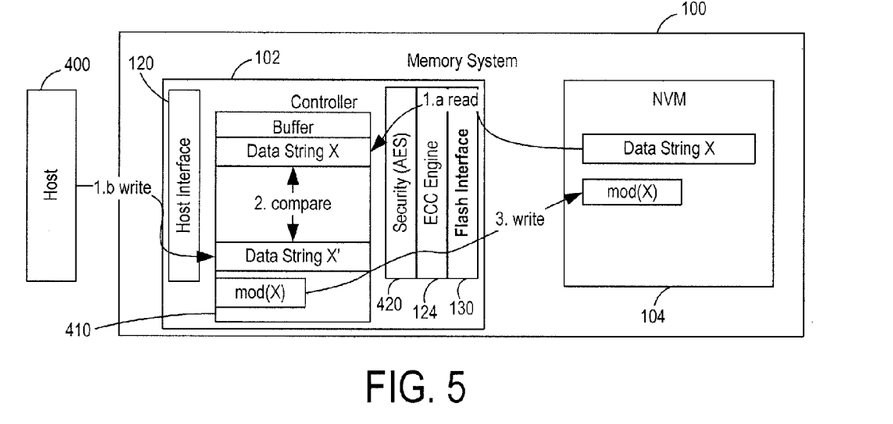
FIG. 5 is a diagram of an embodiment illustrating how differences in to-be-stored and already-stored data are identified.
Figure 6:
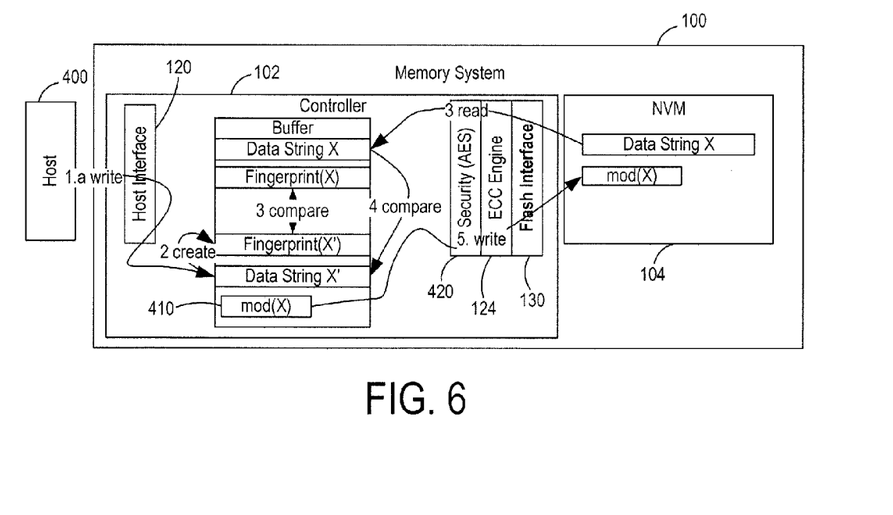
FIG. 6 is a diagram of an embodiment for using a fingerprinting technique to determine whether data is a modified version of already-stored data.

As shown in FIG. 5, the controller 102 receives the data (Data String X') to be written from the host 410 via the host interface 120 and stores it in a buffer 410. The controller 102 also reads the data (Data String X) already stored in the memory 104, passing it through the memory (flash) interface 130, the ECC engine 124, and the encryption (AES) engine 420, and then stores it in a buffer 410. The read from the memory 104 can occur in parallel to the transfer of data from the host 400. If the operations are done in sequence, the read from the memory 104 can occur before or after the transfer of data from the host 400. The controller 102 then compares the two data strings to identify the differences (mod(X)) and stores only the identified differences in memory 104, instead of the entire data string (Data String X') received from the host 410. (As shown in FIG. 6, this comparing process can also be used to determine if incoming data matches "fingerprints" of the heads of strings of stored data (the process discussed above to determine if a delta write triggering event has occurred).)

Figure 7:
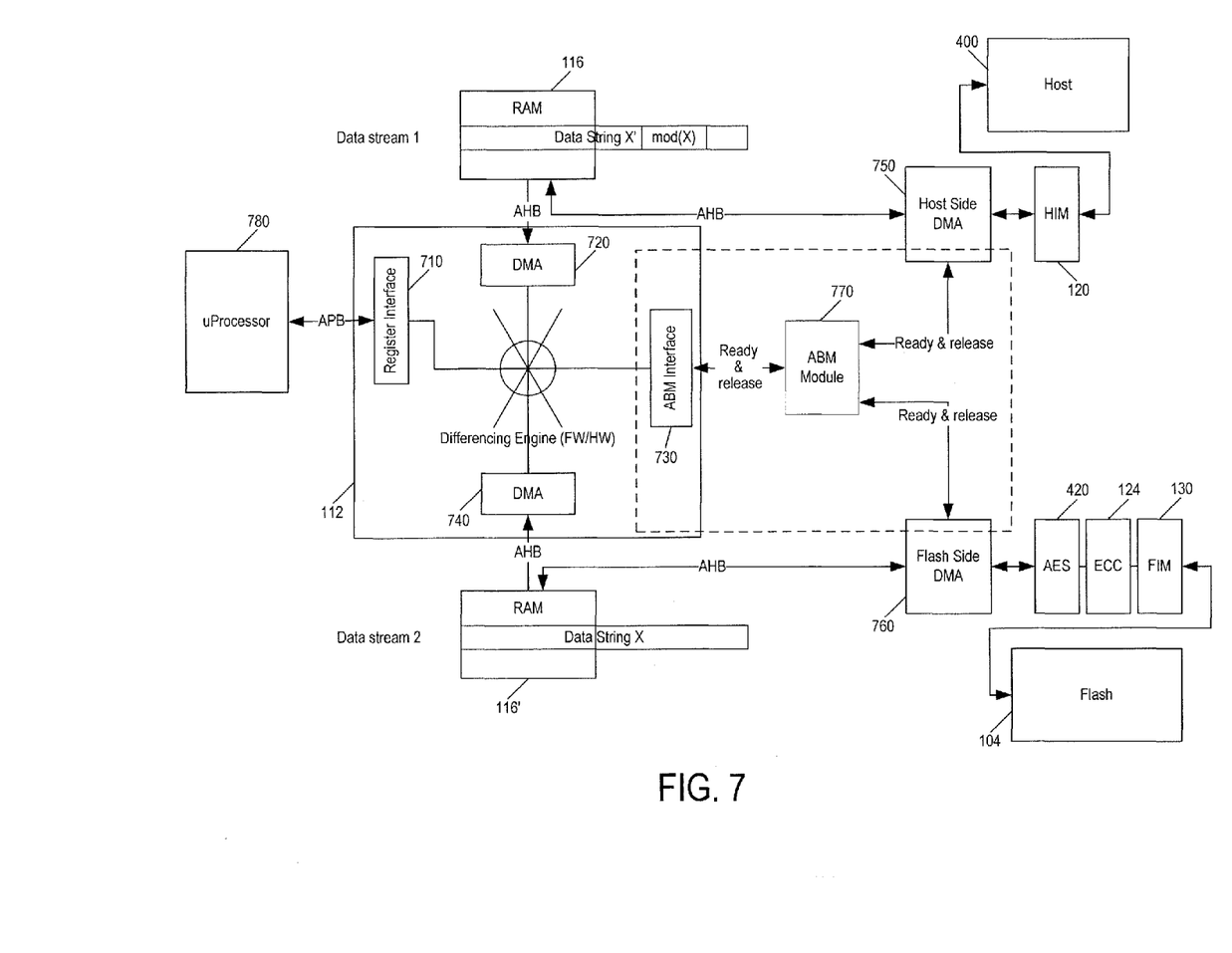
FIG. 7 is a block diagram of a differencing engine of an embodiment.

FIG. 7 shows the comparing operation in more detail and illustrates the use of the differencing engine 112. As shown in FIG. 7, the differencing engine 112 comprises a register interface 710, a first direct memory access (DMA) controller 720, an auto-buffer management (ABM) interface 730, and a second DMA controller 740. The first DMA controller 720 communicates (via an advanced high-performance (AHB) bus) with RAM 116, which stores data streamed from the host 400 (via the host interface module (HIM) 120 and host-side DMA 750). The second DMA controller 740 communicates (via an AHB bus) with RAM 116' (RAM 116' can be part of or separate from RAM 116), which stores previously-stored data streamed from the memory (here, Flash) 104 via the flash interface module (FIM) 130, ECC engine 114, AES engine 420, and flash-side DMA controller 760. The differencing engine 112 compares the two data strings as they are streamed into the differencing engine 112, and the identified differences are stored in the register interface 710 and, eventually provided to the microprocessor 780 (via the advanced peripheral bus (APB) bus), so the microprocessor 780 can store the identified difference in the memory 104 (a process which will be discussed in more detail below).

In one embodiment, the differencing engine 112 is implemented as hardware executing firmware or as an all-hardware implementation, as a general-purpose processor may be too slow to perform the comparison operation without adversely affecting the performance of the memory system 100. Also, due to possible delay involved in comparing the data streams, the ABM module 770 can be used to throttle the streams of the incoming and/or stored data to avoid overflowing the RAM 116, 116'.

Figure 8:
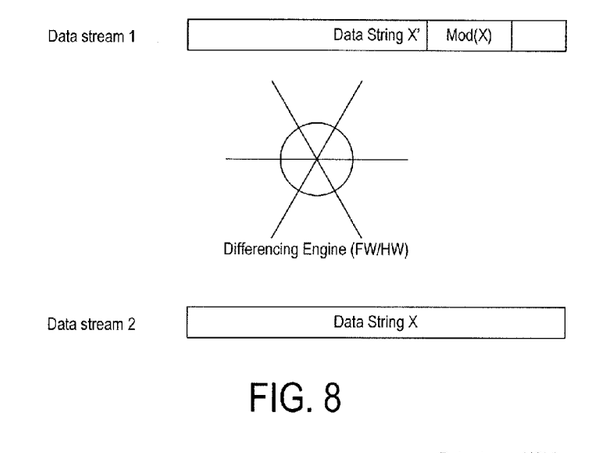
FIGS. 8, 9, and 10 are diagrams illustrating operations of a differencing engine of an embodiment.
Figure 9:
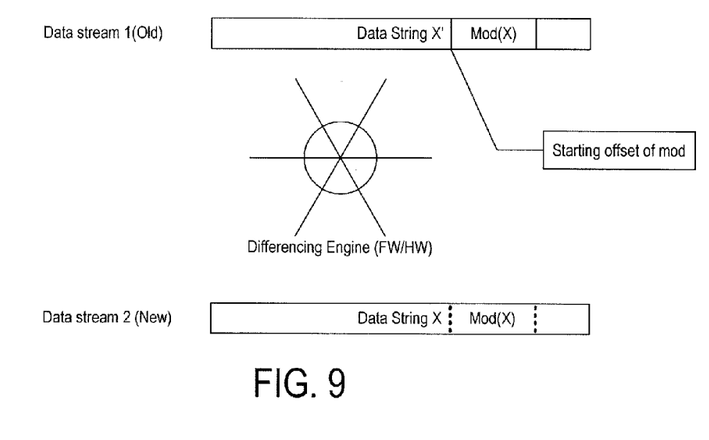
Figure 10:
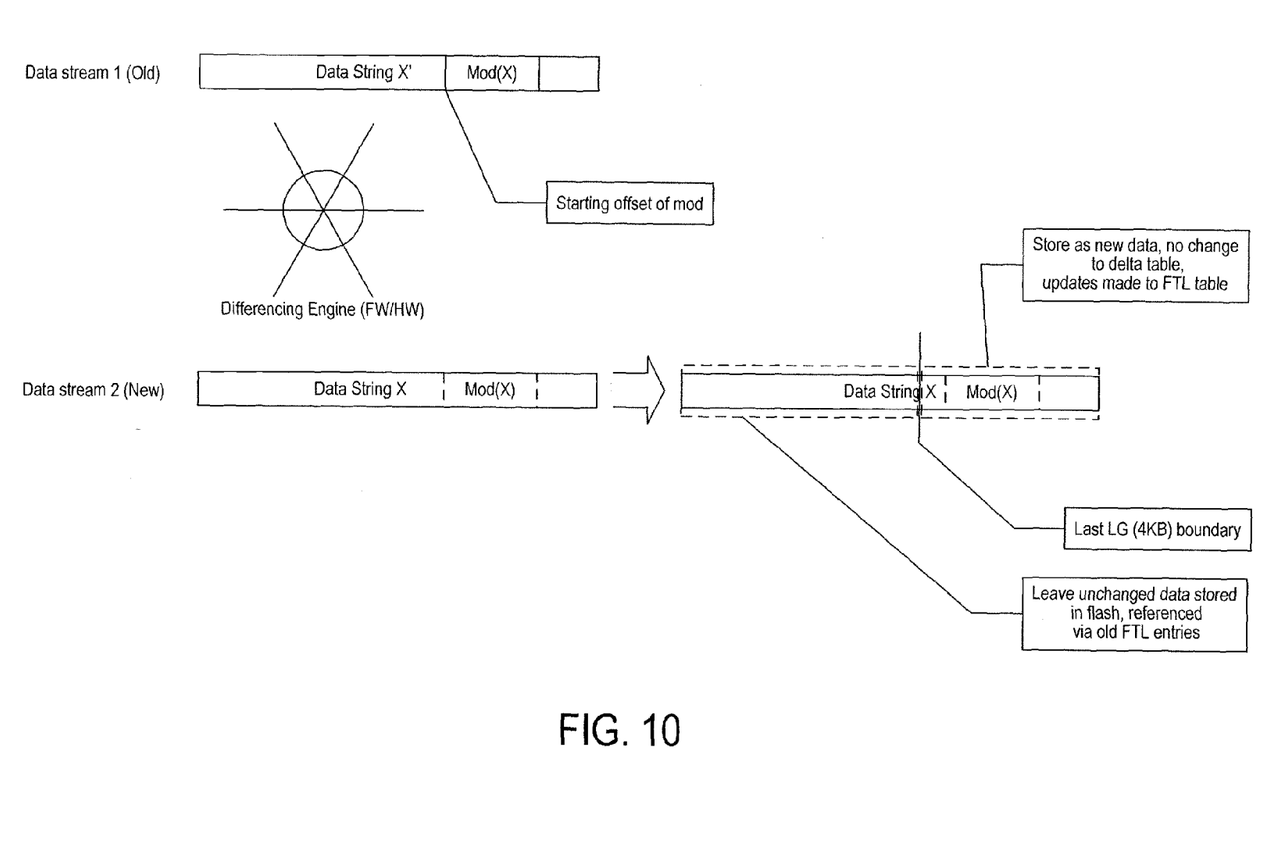

After the differences in the two data streams are identified, the memory system 100 stores (e.g., using the controller 103, the modification storing module 113, or some other component in the memory system 100) the identified differences in the memory 104, along with a table (sometimes referred to herein as a "delta table") that maps the stored identified differences to corresponding locations in the data already stored in the memory 104. FIGS. 8-10 illustrate the operation how the mapping information can be generated. As shown in FIG. 8, the general operation of the differencing engine 112 consists of parsing the two streams until a change (Mod(X)) is found. However, it may also be desired to record the location in the original data that is affected by the modification. For example, as shown in FIG. 9, the memory system 100 can store, in addition to the modified data itself, the starting offset of the modification, as well as the length of the insertion (if applicable), the length of the deletion (if applicable), the length of change (if applicable), and a flag to signal that a difference was detection (an interrupt request (IRQ) can also be used). So, in addition to the modified data itself, the memory system can store the corresponding location information in the following format (although other formats can be used): Offset=xyz; Insert=0; Delete=0; Mod=sizeof(Mod(X)). This information can then be stored as an entry in the delta table (e.g., in RAM 116 or the memory 104). (Use of the delta table will be discussed in more detail below).

Depending on the size of the difference between the two data streams, it may be preferred to store the entirety of the new data stream instead of just the differences. So, the differencing engine 112 can search both the new and old data streams with a limited extent search range to limit the size of the possible delta. In this way, the differences are stored only if they are less than the maximum extend size (i.e., only if Mod(x)<Max extent size), which can be configurable via a register by firmware. So, if the maximum extent size is 16 KB, any delta greater than that can be considered and written as a new cluster. FIG. 10 illustrates an example in which the differences are greater than the maximum extend size (i.e., Mod(x)>=Max extent size). Here, the differencing engine 112 stops the comparison prematurely, and a hardware flag can be set that indicates that the extent limit was reached (e.g., Offset=xyz; Insert=N/A; Delete=N/A; Mod=N/A). The firmware can begin to back up and store the Mod(X) at the last 4 KB boundary. It should be noted that factors other than delta size can be used in determining whether to store only the identified differences or to store all the data requested to be stored. Such other factors include, but are not limited to, a number of times identified differences have been stored for the data already stored in the memory, the age of the data already stored in the memory, and whether or not a rollback feature (discussed below) is implemented.

Figure 11A:
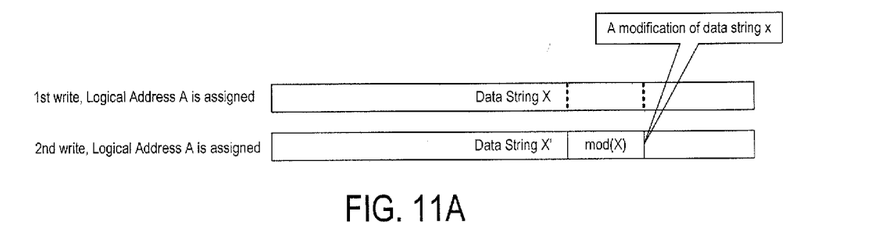
FIGS. 11A and 11B are diagrams illustrating a delta write operation of an embodiment.
Figure 11B:
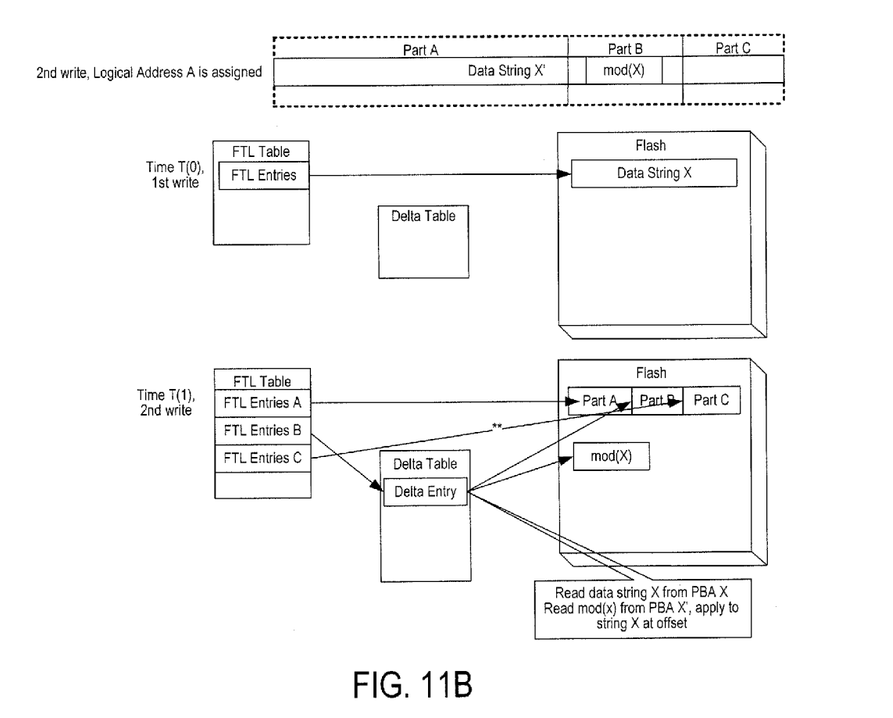

Returning to the drawings, FIGS. 11A and 11B illustrate the use of the delta table discussed above. FIG. 11A shows the storing of the original data in the memory 104. During this first write, logical address A is assigned, and the data is written in the memory 104. At a later time, the host is attempting a second write to logical address A with a modification of the stored data string. Under the delta write technique, only the identified difference in the data would be stored in the memory 104. As shown in FIG. 11B, the data string is broken into three parts in this example. The first part (A) is the unaffected part of the write. The second part (B) is the place of the written data that was modified. The last part (C) is the byproduct of changing the size of the second part (B) in the modified string.

As shown at the bottom of FIG. 11B, since there was no change to part A of the originally-stored data, the flash translation layer (FTL) entry in the FTL table can still point to that part of the previously-stored data in the memory 104. However, since part B was the part of the data string that was changed, that part accounts for the FTL alignment boundaries. So, an entry is added in the delta table with information that maps the identified difference (part B) to the corresponding location in the previously-stored data, and the FTL entry in the FTL table for part B would point to the delta entry in the delta table instead of previously-stored part B. Assuming that the modification to part B did not change its length, the FTL entry in the FTL table for part C can still point to the location of previously-stored part C. However, if the modification to part B did change its length (e.g., due to an insertion or deletion), the FTL entry to the part C may need to go through an exception table if it has to be byte addressed instead of flash-management-unit (FMU) addressed.

The delta table can be used to integrate/merge the delta data with the previously-stored data during a read operation, so that a request to read data string X will result in reading out original parts A and C, as well as the delta data (Mod(X)) instead of outdated part B. Thus, the use of the delta data results in reading out the modified data string instead of the original data string, even though only the deltas of the modified data string were actually written.

It should be noted that while prior deduplication processes use a mapping table, that mapping table is different from the delta table discussed herein. For example, in deduplication, an entry is written in the mapping table for every duplicate entry, so that the logical address for those duplication entries maps to the one physical location storing the data. In contrast, with a delta table, only information about the differences—not the matching data—are stored. This reduces the amount of writes needs to be made to the table, since writes are only made when there are differences.

There are many alternatives that can be used with these embodiments. For example, a time stamp can be stored along with the identified differences (deltas) to enable a tracking/rollback feature. The rollback feature can capture timestamps and retain old copies of the data. In this way, delta updates can become logs and be "unraveled" to make old data persistent for a period of time.

Figure 12:
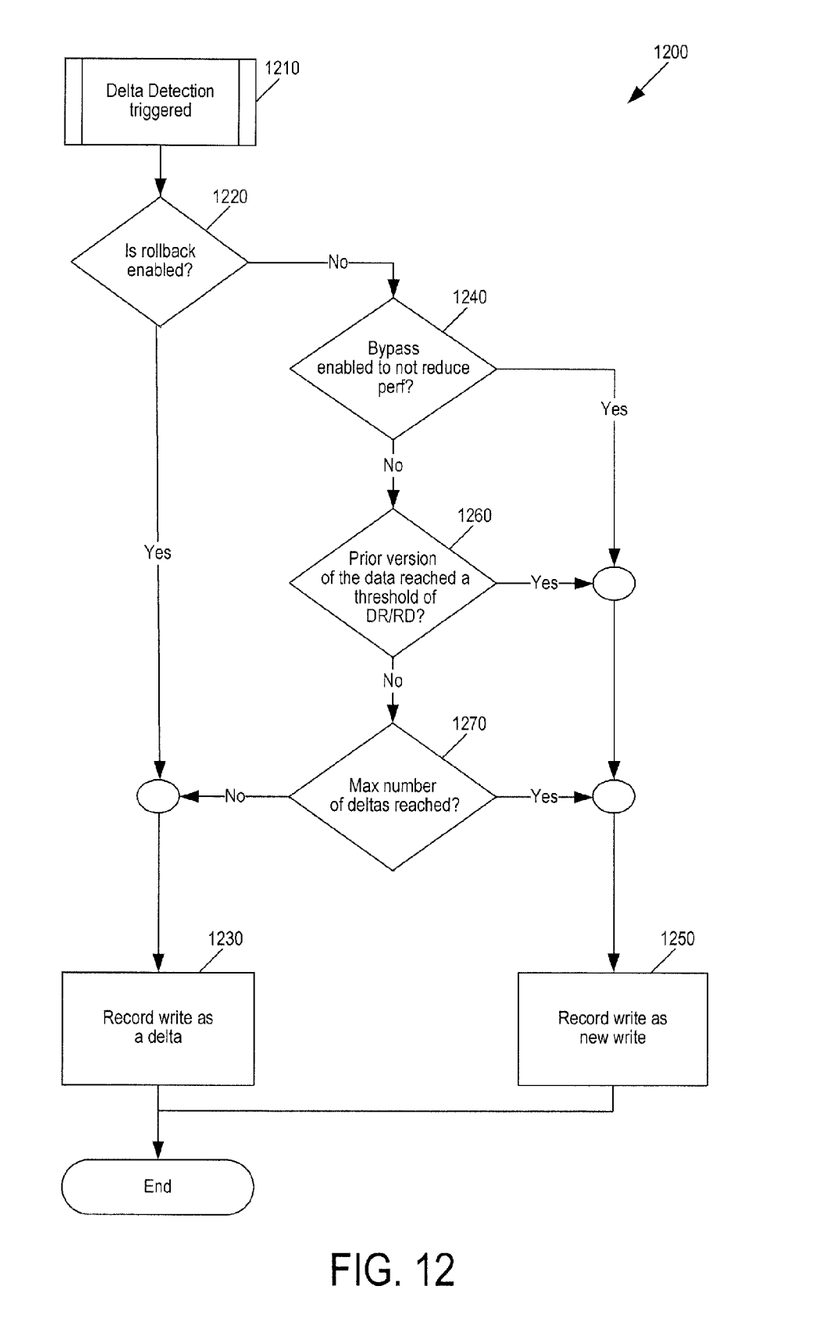
FIG. 12 is a flow chart illustrating a delta write operation of an embodiment.

In another alternative, several factors can weigh into whether or not a delta write is performed. These factors include, but are not limited to, a size of the delta, a number of times deltas have been stored for the data already stored in the memory, age of the delta data already stored in the memory, and whether a rollback feature is implemented. This alternative will be illustrated in conjunction with the flow chart 1200 in FIG. 12. As shown in FIG. 12, when delta detection is triggered (act 1210), the memory system 100 determines if the rollback features is enabled (act 1220). If the rollback features is enabled, the write is recorded as a delta (act 1230). If the rollback features is not enabled (e.g., via drive, drive partition, or by input-output request), the memory system 100 determines if a bypass features is enabled to not reduce performance (act 1240). If it is, the write is recorded as a new write (act 1250); otherwise, the memory system 100 determines if a prior version of the data reached a threshold of data retention (DR) or read disturbs (RD), which would indicate that the old data is nearing scrub time (act 1260). If it has (e.g., if the data has reached its "end of life"), the write is recorded as a new write, thereby re-writing the entire data set (act 1250); otherwise, the memory system 100 determines if a maximum number of deltas has been reached (act 1270). If it has, the write is recorded as a new write (act 1250); otherwise, the write is recorded as a delta (act 1230).

As another alternative, instead of storing deltas as they occur, the memory system 100 can collect a set of deltas and stored them together (e.g., in a page). (A delta can be as small as a single byte, and deltas can be collected as fragments, just like small write fragments.) Avoiding small update writes provides performance and endurance advantages for the memory system 100 and avoids inefficiencies at the host 400. Collecting the deltas allows writes to be performed faster when a delta write hit occurs, but there can be a read performance penalty in having to coalesce a series of deltas. This alternative is shown in more detail in FIGS. 13A-13C.

Figure 13A:
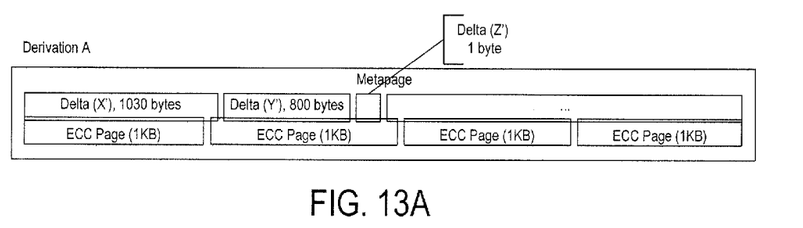
FIGS. 13A-13C are diagrams illustrating a compaction operation of an embodiment.
Figure 13B:
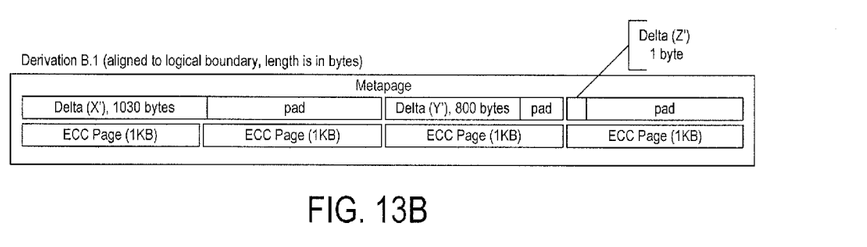
Figure 13C:
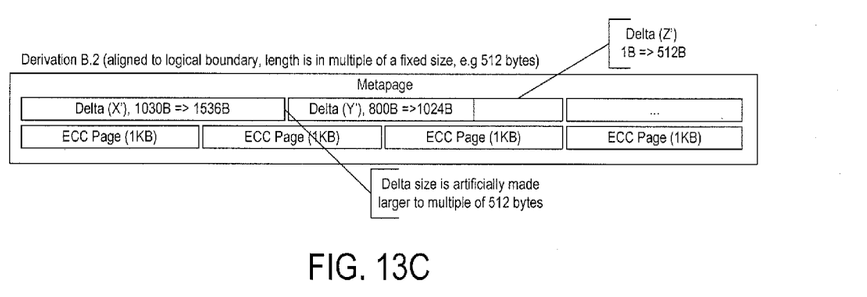

In FIG. 13A (Derivation A), the delta fragments are not aligned to any logical boundary (be it a fragment of an ECC page (for example, 512 bytes) or an ECC page). The alignment is in bytes, and the length is in bytes. In FIG. 13B (Derivation B.1), for a slight savings of space in storing the physical address in the delta table, the delta data can be stored aligned to a logical boundary within the metapage. In FIG. 13C (Derivation B.2), another savings is recognized by making the delta length a multiple of a constant size (instead of in bytes).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for storing a modified version of data in a memory system, the method comprising:
performing the following in a processor of a memory system, wherein the memory system comprises a memory:
receiving a request to store data in the memory;
determining whether the data requested to be stored in the memory is a modified version of data already stored in the memory, wherein the determining is performed by comparing only a part of the data requested to be stored with a corresponding part of data already stored in the memory; and
only after determining that there is a match between the compared parts:
comparing all of the data requested to be stored in the memory with the data already stored in the memory to identify differences between the data to be stored and the data already stored; and
storing the identified differences in the memory.

2. The method of claim 1, wherein the corresponding part is read and pre-stored in the memory before the request is received.

3. The method of claim 1, wherein the corresponding part is read on-the-fly when the request is received.

4. The method of claim 1 further comprising:
determining whether to store only the identified differences or to store all the data requested to be stored.

5. The method of claim 4, wherein the determining whether to store only the identified differences is based on one or more of the following: a size of the identified differences, a number of times identified differences have been stored for the data already stored in the memory, age of the data already stored in the memory, and whether a rollback feature is implemented.

6. The method of claim 1 further comprising: collecting a set of identified differences for a plurality of sets of data already stored in the memory before storing the set of identified differences in the memory.

7. The method of claim 1 further comprising storing a time stamp with the identified differences.

8. The method of claim 1, wherein the memory is a three-dimensional memory.

9. The method of claim 1, wherein the memory system is embedded in a host.

10. The method of claim 1, wherein the memory system is removably connected to a host.

11. The method of claim 1 further comprising storing a table in the memory that maps the stored identified differences to corresponding locations in the data already stored in the memory.

12. The method of claim 11 further comprising:
in response a request to read the data already stored in the memory, using the table to integrate the stored identified differences with the rest of the data to return the modified version of the data.

13. The method of claim 1, wherein all of the data requested to be stored is compared to identify the differences, whereas only part of the data requested to be stored is compared to determine whether the data requested to be stored is a modified version of data already stored.

14. A memory system comprising:
a memory: and
a controller in communication with the memory, wherein the controller is configured to:
detect a delta write triggering event, wherein the delta write trigger event is detected by comparing only a part of data requested to be stored in the memory with a corresponding part of data previously stored in the memory; and
in response to detecting the delta write triggering event:
compare all of the data requested to be stored in the memory with the data previously stored in the memory to identify delta data between the data requested to be stored in the memory and the previously-stored data; and
store the delta data in the memory.

15. The memory system of claim 14, wherein the corresponding part is read and pre-stored in the memory.

16. The memory system of claim 14, wherein the corresponding part is read on-the-fly.

17. The memory system of claim 14, wherein the controller is further configured to determine to store only the delta data instead of all the data.

18. The memory system of claim 17, wherein the controller is configured to determine to store the delta data instead of all the data based on one or more of the following: a size of the delta data, a number of times delta data has been stored for the previously-store data, age of the previously-stored data, and whether a rollback feature is implemented.

19. The memory system of claim 14, wherein the controller is further configured to collect a set of delta data before storing the set in the memory.

20. The memory system of claim 14, wherein the controller is further configured to store a time stamp with the identified differences.

21. The memory system of claim 14, wherein the memory is a three-dimensional memory.

22. The memory system of claim 14, wherein the memory system is embedded in a host.

23. The memory system of claim 14, wherein the memory system is removably connected to a host.

24. The memory system of claim 14, wherein the controller is further configured to store an entry in a delta table in the memory that integrates the delta data with the previously-stored data.

25. The memory system of claim 14, wherein all of the data requested to be stored is compared to identify delta data, whereas only part of the data requested to be stored is compared to detect a delta write triggering event.

26. A memory system comprising:

a memory;

means for determining whether data to be stored in the memory is a modified version of data already stored in the memory by comparing only a part of the data to be stored in the memory with a corresponding part of data already stored in the memory; and means for, in response to determining that there is a match between the compared parts, comparing all of the data to be stored in the memory with the data already stored in the memory to identify differences between the data to be stored and the data already stored and storing the differences in the memory.

27. The memory system of claim 26, wherein the corresponding part is read and pre-stored in the memory.

28. The memory system of claim 26, wherein the corresponding part is read on-the-fly.

29. The memory system of claim 26, wherein the modification storing module is further configured to determine whether to store only the differences or to store all the data requested to be stored.

30. The memory system of claim 29, wherein the determining whether to store only the differences is based on one or more of the following: a size of the differences, a number of times differences has been stored for the data already stored in the memory, age of the data already stored in the memory, and whether a rollback feature is implemented.

31. The memory system of claim 26, wherein the modification storing module is further configured to collect a set of differences for a plurality of sets of data already stored in the memory before storing the set in the memory.

32. The memory system of claim 26, wherein the modification storing module is further configured to store a time stamp with the identified differences.

33. The memory system of claim 26, wherein the memory is a three-dimensional memory.

34. The memory system of claim 26, wherein the memory system is embedded in a host.

35. The memory system of claim 26, wherein the memory system is removably connected to a host.

36. The memory system of claim 26, wherein the modification storing module is further configured to store a table in the memory that maps the differences to the data already stored in the memory.

37. The memory system of claim 26, wherein all of the data to be stored is compared by the differencing engine, whereas only part of the data to be stored is compared by the modification detection module.

* * * * *